(12) United States Patent
Peterson

(10) Patent No.: US 7,093,365 B2
(45) Date of Patent: Aug. 22, 2006

(54) HEAVY DUTY DRILL SHEAR ATTACHMENT

(75) Inventor: Eric L. Peterson, Maple Lake, MN (US)

(73) Assignee: Malco Products, Inc., Annandale, MN (US)

( * ) Notice: Subject to any disclaimer, the term of this patent is extended or adjusted under 35 U.S.C. 154(b) by 26 days.

(21) Appl. No.: 10/936,324

(22) Filed: Sep. 8, 2004

(65) Prior Publication Data
US 2005/0028391 A1    Feb. 10, 2005

Related U.S. Application Data

(63) Continuation-in-part of application No. 29/195,810, filed on Dec. 16, 2003, which is a continuation-in-part of application No. 29/176,745, filed on Feb. 25, 2003, now Pat. No. Des. 488,695.

(51) Int. Cl.
    *B26B 13/00* (2006.01)
(52) U.S. Cl. .............................. 30/122; 30/500; 30/210
(58) Field of Classification Search ................. 30/122, 30/500, 210, 228
    See application file for complete search history.

(56) References Cited

U.S. PATENT DOCUMENTS

| | | | |
|---|---|---|---|
| 2,047,483 A | 7/1936 | McArdle et al. | |
| 2,256,779 A | 9/1941 | McHenry | |
| 2,604,695 A | 7/1952 | McGary et al. | |
| 2,635,335 A | 4/1953 | James | |
| 2,760,265 A | 8/1956 | Draenert | |
| 2,840,904 A * | 7/1958 | Hutchins | 30/210 |
| D197,987 S | 4/1964 | Docken | |
| D222,332 S | 10/1971 | Current | |
| 3,654,700 A | 4/1972 | Pawloski | |
| D229,023 S | 11/1973 | Laurenti | |
| 3,787,742 A | 1/1974 | Murphy | |
| 3,808,682 A | 5/1974 | Sumida | |
| 4,317,282 A * | 3/1982 | Pace | 30/122 |
| 4,369,576 A | 1/1983 | McVaugh | |
| 4,479,303 A * | 10/1984 | Gardner | 30/383 |
| 4,505,037 A * | 3/1985 | Farkas | 30/122 |
| 4,674,185 A * | 6/1987 | Gardner | 30/122 |
| 4,682,416 A | 7/1987 | Stolfa | |
| 5,371,947 A * | 12/1994 | Dickey et al. | 30/122 |
| 5,771,582 A * | 6/1998 | Tuggle | 30/125 |
| 5,901,447 A | 5/1999 | Dunning | |
| 5,992,024 A | 11/1999 | Rogers | |
| 5,993,303 A | 11/1999 | Fladgard et al. | |
| D426,443 S | 6/2000 | Lai | |

(Continued)

OTHER PUBLICATIONS

Excalibur Tools Ply Limited brochure; Jan. 24, 2003; Internet portion.

*Primary Examiner*—Hwei-Siu Payer
(74) *Attorney, Agent, or Firm*—Gerald E. Helget; Nelson R. Capes; Briggs & Morgan, P.A.

(57) ABSTRACT

Drill shear attachment clamps for a shear attachment with shear blades connected to a chuck of a portable drill includes left and right rails extending from and secured to the left housing side of the shear attachment along the drill body to a point beyond the rear of the drill body to a rear end. A connector adjustably is fastened to the rear ends of the rails to adjustably draw the ends together for nonrotatable securing of the shear attachment to the drill for one-handed operation of the drill with the shear attachment in either a right side up or upside down drill orientation.

10 Claims, 2 Drawing Sheets

U.S. PATENT DOCUMENTS

| | | |
|---|---|---|
| 6,178,643 B1 | 1/2001 | Erbrick et al. |
| D443,806 S | 6/2001 | Fladgard et al. |
| 6,250,998 B1 | 6/2001 | Fladgard et al. |
| D488,695 S | 4/2004 | Peterson |
| 6,776,150 B1 | 8/2004 | Gaidjiergis et al. |
| 2005/0028391 A1 | 2/2005 | Peterson |

* cited by examiner

HEAVY DUTY DRILL SHEAR ATTACHMENT

This application is a continuation-in-part of U.S. Design patent application Ser. No. 29/195,810 filed on Dec. 16, 2003, which is a continuation-in-part application of U.S. Design patent application Ser. No. 29/176,745 filed on Feb. 25, 2003, now U.S. Pat. No. D. 488,695 for a Drill Shear Attachment.

BACKGROUND OF THE INVENTION

The present invention relates to a drill shear attachment for a portable hand drill, and more particularly to, drill shear attachment clamps for securing the shear attachment to the drill body to prevent shear attachment rotation and to permit one-handed operation of the drill with the shear attachment.

Building materials include metal panels, steel mesh, galvanized sheet metal, furnace jackets, spiral ducts, stone coated metal shingles and various types of corrugation metal panels. Panels that are also to be cut include automotive body panels for repair and replacement. U.S. Pat. No. 2,047,483 shows an example of electric shears which have begun to replace hand operated shears. U.S. Pat. No. 2,256,779 shows a shear attachment for a power drill unit. This attachment is quite cumbersome and not capable of navigating tight curves, patterns, or squares in heavy-duty gauge steel. U.S. Pat. No. 2,604,695 shows a hand-operated shear which has been used for decades to cut such metal sheets and panels. U.S. Pat. No. 2,635,335 shows a power driven hand-held sheet metal shears attachable to a drill with a one-way stabilizer that gives limited positioning of the attached metal shears. U.S. Pat. No. 3,654,700 shows a shear cutting head with a pair of movable jaws that supposedly does not cause the severed portion of the material to curl. U.S. Pat. No. 4,682,416 shows a metal cutting shear attachment securable to the collar of a portable drill.

Applicant's design U.S. Pat. No. D488,695 shows a simple drill shear attachment to a portable drill with a generally vertically oriented handle thereby requiring two-handed operation of the drill with the shear attachment.

There is a need for drill shear attachment clamps to secure a shear attachment to the chuck of portable drill as well as to the elongate drill body for single-handed operations in either the right side up or upside down orientation.

SUMMARY OF THE INVENTION

Drill shear attachment clamps for a shear attachment with shear blades connected to a chuck of a portable drill includes left and right rails extending from and secured to the left housing side of the shear attachment along the drill body to a point beyond the rear of the drill body to a rear end. A connector adjustably is fastened to the rear ends of the rails to adjustably draw the ends together for nonrotatable securing of the shear attachment to the drill for one-handed operation of the drill with the shear attachment in either a right side up or upside down drill orientation.

A principle object and advantage of the present invention is that the drill shear attachment clamps secure the shear attachment to the portable drill so the drill and shear attachment may be used in a right side up or upside down orientation single handedly.

Another object and advantage of the present invention of the present invention is that it makes a portable drill into a power shear almost instantly with attachment to the chuck and securement of the drill shear attachment clamps about the body of the drill.

Another object and advantage of the present invention is that it is capable of navigating tight curved patterns and square cuts, as well as blind cuts, also suitably making short of long rip cuts without the premium price of a dedicated power shear.

DETAILED SPECIFICATION

Figure 1:
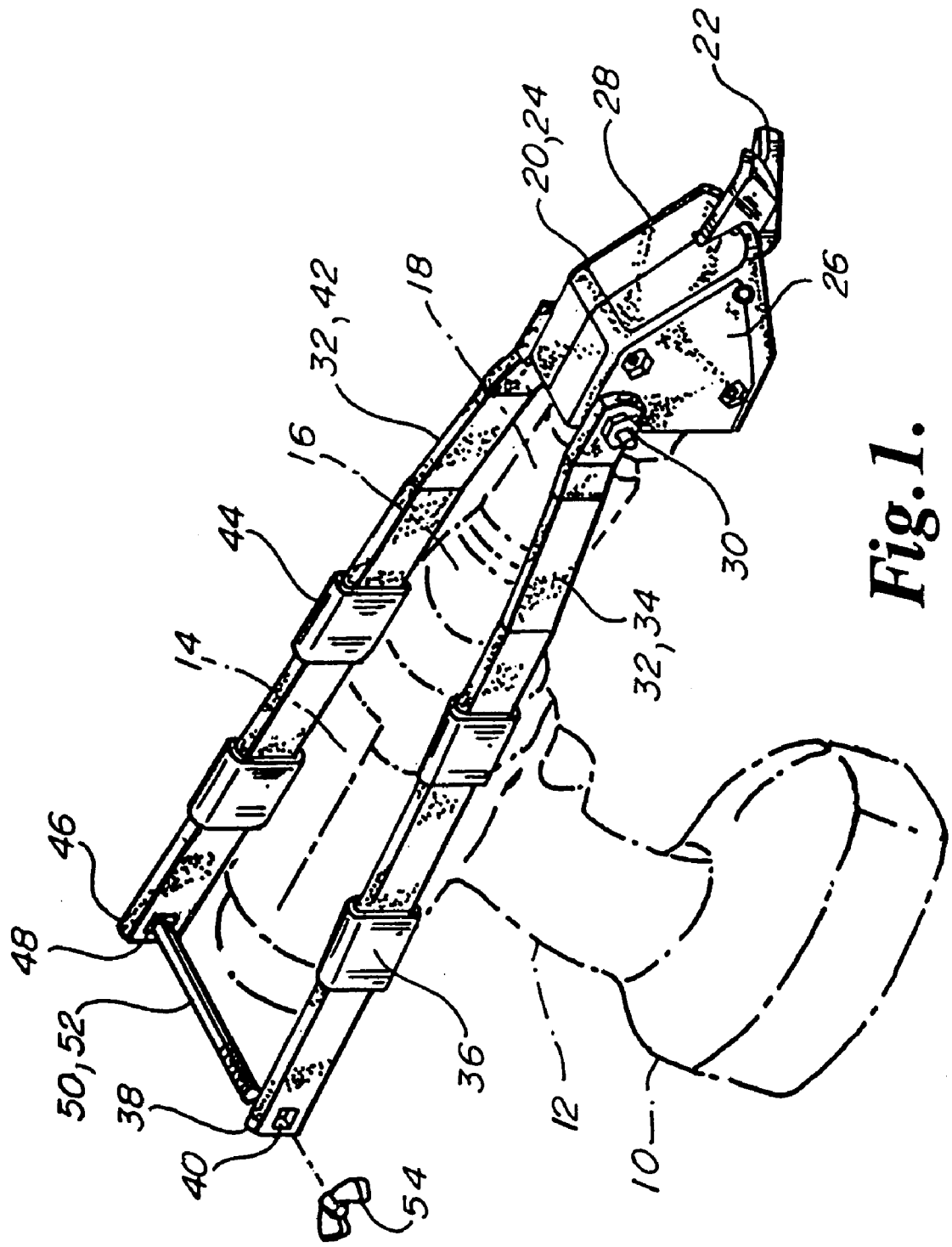
FIG. 1 is a perspective view of the drill shear attachment clamps for a shear attachment attached to a portable drill shown in phantom outline in a right side up orientation.
Figure 2:
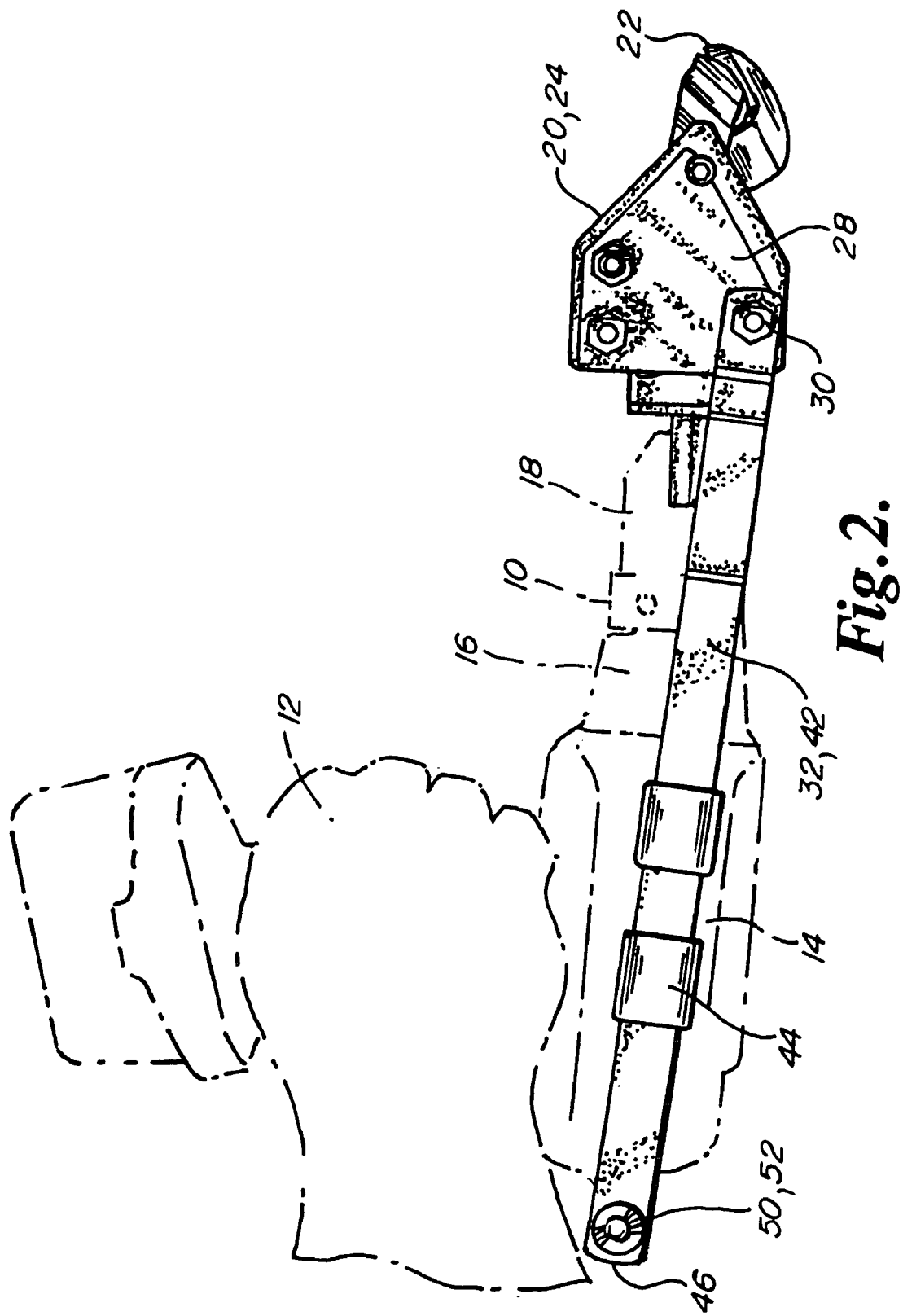
FIG. 2 is another elevational view of the drill shear attachment clamps for a shear attachment mounted to a portable drill in an upside down drill orientation.

Referring to FIGS. 1 and 2, the drill shear attachment clamps 32 of the present invention generally include left and right rails 34 and 42 securable about the body 14 of a portable drill 10 by a connector 50.

More particularly, a portable drill 10 generally includes a grip 12, a housing, or body 14 that is elongate and supports a forward collar 16. Forward of the collar 16 is a bit chuck 18.

The drill shear attachment 20 generally includes shear blades 22 that extend forwardly from housing 24 which translates rotational power from the portable drill 10 into relative movement the shear blades 22. The housing 24 has a left side 26 and a right side 28 secured together suitably by bolts or screws 30.

The drill shear attachment clamps 32 of the present invention prevent the drill shear attachment 20 from rotating with the chuck 18. The drill shear attachment clamps 32 generally include a left rail, arm, or bracket 34 upon which are slidable grip pads 36 for orientation about the drill body 14 being careful to avoid any vent holes on the drill 10. Left rail 34 ends in a rear end 38 through which is aperture 40. Clamps 32 also include right rail arm or bracket 42 similarly with slidable grip pads 44 ending in a rear end 48 through which aperture 48 passes. The rear ends 38 and 46 are rearward of the elongate body 14 of portable drill 10. The aperture 40 and 48 line up to permit connector 50 or carriage bolt 52 to pass there through which is secured by wing nut 54. The tightening of wing nut 54 secures the drill shear attachment clamps 32 about the body 14 of the portable drill and hence prohibit the rotation of the shear attachment 20 along with chuck 18 to permit proper operation.

By this arrangement, single handed use of the portable drill 10 along with the shear attachment 20 may be used in either the right side up fashion shown in FIG. 1 or the reverse orientation which is upside down for the portable drill 10 is shown in FIG. 2.

The specification and illustrated embodiments herein are for illustrative purposes only, care being given to the scope of the invention by a review of the following claims.

The invention claimed is:

1. Drill shear attachment clamps for a shear attachment with shear blades extending from a housing with left and right housing sides, the shear attachment adapted to be connected to the chuck of a portable drill extending from an elongate drill body from which extends a hand grip, the drill shear attachment clamps comprising:

(a) a left rail adapted to extend from, and adapted to be secured to, the left housing side along the drill body to a point beyond the rear of the drill body to a rear end;

(b) a right rail adapted to extend from, and adapted to be secured to, the right housing side along the drill body to a point beyond the rear of the drill body to a rear end; and (c) a connector fastened to the rear ends to adjustably draw the ends together for nonrotatably securing the shear attachment to the drill for one-handed operation of the drill with the shear attachment in a right side up or an upside down drill orientation.

2. The drill shear attachment clamps of claim 1, further comprising a grip pad on each rail to anti-slip grip the drill body.

3. The drill shear attachment clamps of claim 1, wherein the rear ends of the rails each have an aperture therethrough.

4. The drill shear attachment clamps of claim 3, wherein the connector comprises a threaded bolt and a wing nut.

5. Drill shear attachment clamps for a shear attachment with shear blades extending from a housing with left and right housing sides, the shear attachment adapted to be connected to the chuck of a portable drill extending from an elongate drill body from which extends a hand grip, the drill shear attachment clamps comprising:

(a) a left rail adapted to extend from, and adapted to be secured to, the left housing side along the drill body to a point beyond the rear of the drill body to a rear end;

(b) a right rail adapted to extend from and adapted to be secured to, the right housing side along the drill body to a point beyond the rear of the drill body to a rear end;

(c) a grip pad on each rail to anti-slip grip the drill body; and (d) a connector fastened to the rear ends to adjustably draw the ends together for nonrotatably securing the shear attachment to the drill for one-handed operation of the drill with the shear attachment in a right side up or an upside down drill orientation.

6. The drill shear attachment clamps of claim 5 wherein the rear ends of the rails each have an aperture therethrough.

7. The drill shear attachment clamps of claim 6, wherein the connector comprises a threaded bolt and a wing nut.

8. Drill shear attachment clamps for a shear attachment with shear blades extending from a housing with left and right housing sides, the shear attachment adapted to be connected to the chuck of a portable drill extending from an elongate drill body fro which extends a hand grip, the drill shear attachment clamps comprising:

(a) a left rail adapted to extend from, and adapted to be secured to, the left housing side along the drill body to a point beyond the rear of the drill body to a rear end having an aperture therethrough;

(b) a right rail adapted to extend from, and adapted to be secured to, the right housing side along the drill body to a point beyond the rear of the drill body to a rear end having an aperture therethrough;

(c) a threaded bolt and a wing nut fastened through the apertures at the rear ends to adjustably draw the ends together for nonrotatably securing the shear attachment to the drill for one-handed operation of the drill with the shear attachment in a right side up or an upside down drill orientation.

9. Drill shear attachment clamps for a shear attachment with shear blades extending from a housing with left and right housing sides, the shear attachment adapted to be connected to the chuck of a portable drill extending from an elongate drill body from which extends a hand grip, the drill shear attachment clamps comprising:

(a) a left rail adapted to extend from and adapted to be secured to, the left housing side along the drill body to a point beyond the rear of the drill body to a rear end having an aperture therethrough;

(b) a right rail adapted to extend from, and adapted to be secured to, the right housing side along the drill body to a point beyond the rear of the drill body to a rear end having an aperture therethrough;

(c) a grip pad on each rail to anti-slip grip the drill body; and (d) a threaded bolt and a wing nut fastened through the apertures at the rear ends to adjustably draw the ends together for nonrotatably securing the shear attachment to the drill for one-handed operation of the drill with the shear attachment in a right side up or an upside down drill orientation.

10. Drill shear attachment clamps for a shear attachment with shear blades extending from a housing with left and right housing sides, the shear attachment adapted to be connected to the chuck of a portable drill extending from an elongate drill body from which extends a hand grip, the drill shear attachment clamps comprising:

(a) a left rail adapted to extend from, and adapted to be secured to, the left housing side along the drill body to a point beyond the rear of the drill body to a rear end;

(b) a right rail adapted to extend from, and adapted to be secured to, the right housing side along the drill body to a point beyond the rear of the drill body to a rear end;

(c) a connector fastened to the rear ends to adjustably draw the ends together for non-rotatably securing the shear attachment to the drill for one-handed operation of the drill with the shear attachment in a right side up or an upside down drill orientation; and (d) a slidable grip pad on each rail to anti-slip grip the drill body.

* * * * *